A. H. MARCOU.
AIR COMPRESSOR.
APPLICATION FILED APR. 25, 1911.

1,026,521.

Patented May 14, 1912.

WITNESSES:
John C. Sanders
Arthur S. Pettit

INVENTOR:
Andre Henri Marcou
BY
ATTY.

UNITED STATES PATENT OFFICE.

ANDRÉ HENRI MARCOU, OF VERSAILLES, FRANCE.

AIR-COMPRESSOR.

1,026,521.    Specification of Letters Patent.    Patented May 14, 1912.

Application filed April 25, 1911. Serial No. 623,206.

*To all whom it may concern:*

Be it known that I, ANDRÉ HENRI MARCOU, of Impasse des Chevau-Légers, Versailles, Seine and Oise, Republic of France, proprietor, have invented Improvements in Air-Compressors, of which the following is a full, clear, and exact description.

This invention relates to air compressors and more particularly to compressors for motor cars, driven from the engine.

The invention has for object an improved air compressor in which heating of the air and of the pump is avoided, and in which the operation is automatic, the pump ceasing to act when the air in the compressed air receiver has attained a desired limit.

The invention consists in the combination with a single acting air pump of any known type, of a suitable elastic device driving the piston of the said pump during its working or compression stroke and of a clutch mechanism driven by the engine through speed reducing gearing and adapted to drive the piston of the air pump during its suction stroke.

The invention also consists in the application of a heavy body rigidly connected to the piston of the said air pump, adapted to store up at the beginning of the power stroke of the piston, the excess energy contained in the elastic device, and to give out this energy at the end of the stroke.

Figure 1:
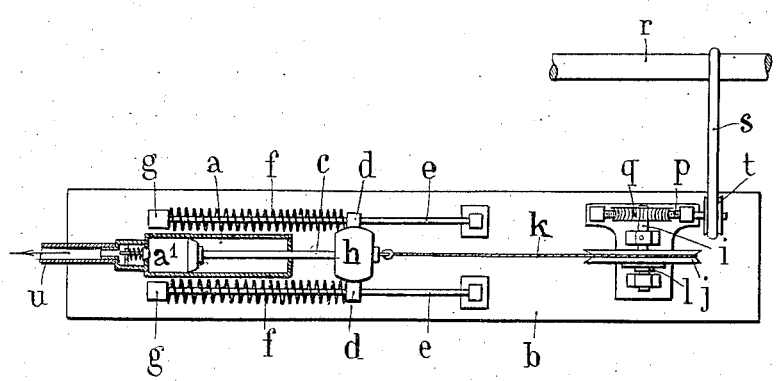
Figure 2:
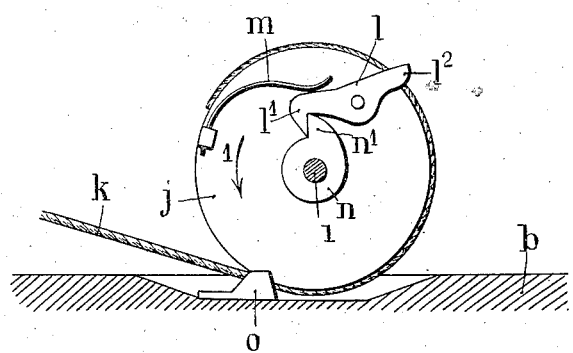

One means of carrying out the invention is illustrated in the accompanying drawings, in which:

Figure 1 is a general plan view of the air compressor. Fig. 2 is a view of the pawl mechanism.

As will be seen in the drawing, Fig. 1, a single acting air-pump $a$ of any type is fixed on a long base plate $b$ supporting the whole of the mechanism. The piston rod $c$ of this air-pump is provided with a cross head $d$ which works freely on two parallel slides $e$ fixed to the base plate $b$. Two springs $f$ fixed at one end to two fixed points $g$ of the base plate $b$, are connected at their other ends to the cross head $d$ so as to continually draw the piston of the air-pump toward the bottom of the cylinder. On the cross head $d$ there is mounted in any suitable manner a heavy body $h$ for rendering uniform the action of the springs $f$.

In line with the piston rod $c$ a grooved drum $j$ is mounted loosely on a shaft $i$ and around this drum is passed a cable $k$, the end of which is connected to the cross head $d$. This drum $j$, Fig. 2, is provided with a pawl $l$ of which the tooth $l'$ is subjected to the action of a spring $m$ also mounted on the drum $j$, and is thereby constantly pressed against a cam $n$ keyed on the shaft $i$. A stop $o$ fixed on the base plate $b$ disengages the pawl mechanism at the desired instant and thus frees the drum $j$.

The shaft $i$ is driven by a worm $p$ engaging with a worm wheel $q$ keyed on the said shaft; the worm $p$ is itself driven from the engine shaft $r$ through a belt $s$ of any type passing around the said engine shaft and a pulley $t$ on the worm $p$.

The air compressor arranged as above operates in the following manner: The engine when started drives the worm $p$ through the belt $s$, thereby rotating the shaft $i$ and the cam $n$ keyed thereon, in the direction of the arrow 1 (Fig. 2). When the tooth $n'$ of the cam $n$ encounters the tooth $l'$ of the pawl $l$, the drum $j$ is carried around by the shaft $i$. The cable $k$ becomes wound around the drum $j$ and causes the displacement of the heavy body $h$ and the piston $a'$ of the air-pump $a$, against the action of the springs $f$ which are thus placed in tension. The length of the cable $k$ is so calculated that when the piston $a'$ is at the end of its stroke the heel $l^2$ of the pawl encounters the fixed stop $o$. On this instant the tooth $l'$ of the said pawl disengages from the tooth $n'$ the result of which is to free the drum $j$. Under the action of the springs $f$, the heavy body $h$ and the piston $a'$ are forced as a whole in the opposite direction and the air in the cylinder behind the piston $a'$ is compressed and driven into a suitable receiver connected to the air-pump by a pipe $u$.

The adoption of the heavy body $h$ has for object to render uniform the action of the springs $f$ and the kinetic energy stored up in all the moving parts. At the beginning of the power stroke of the piston $a'$ the springs are stretched to the maximum and exert a force greater than the pressure required to drive the compressed air into the receiver. The heavy body $h$ resists too sudden motion of the piston $a'$ and thus makes it possible to avoid heating the compressed air; the said body $h$ stores up energy which it gives out at the end of the stroke in the form of kinetic energy, at the time when the tension of the springs would no longer be sufficient to subject the air to a suitable pressure.

The compressor according to the present invention has the advantages that owing to the intermittent movement transmitted to the piston of the air pump, heating of the air and of the said pump is completely avoided, and that the operation of the compressor is automatic, the stroke of the piston decreasing in proportion as the pressure rises in the receiver and becoming zero when the limit of pressure is attained. The compressor is, moreover, of very simple and inexpensive construction.

The above construction is given by way of example only; instead of a drum with a pawl the compressor may comprise any other clutch mechanism such as broken gearing, a scroll, etc., and the form, dimensions and detail arrangements may be varied to suit the application without altering the principle of the invention.

Claims:

1. In an air compressor, the combination of a piston, a heavy body secured on the piston rod, an elastic device for throwing forward said piston and its body, a device for stretching the elastic device and a releasing device for allowing said elastic device to suddenly unstretch.

2. In an air compressor, the combination of a piston, a heavy body secured on the piston rod, one or more coil springs attached on the heavy body, a device for bringing back said body by stretching the springs, and a device for suddenly releasing said body.

3. In an air compressor, the combination of a piston, a heavy body secured on the piston rod, one or more coil springs attached on the heavy body, a ribbon attached to the heavy body, a drum for winding the ribbon and drawing the heavy body, a driving device for the drum, producing the winding of the ribbon and a device for releasing the drum and allowing said ribbon to suddenly unwind.

4. In an air compressor, the combination of a piston, a heavy body secured on the piston rod, one or more coil springs attached on the heavy body, a ribbon attached to the heavy body, a drum for winding the ribbon and drawing the heavy body, a rotary driving shaft for the drum, producing the winding of the ribbon, a pawl to render the drum integral with the driving shaft and a fixed abutment in the path of the pawl tail for releasing the pawl and disengaging the drum from the driving shaft.

The foregoing specification of my improvements in air compressors signed by me this 14th day of April 1911.

ANDRÉ HENRI MARCOU.

Witnesses:
  DEAN B. MASON,
  R. THIRIOT.

Copies of this patent may be obtained for five cents each, by addressing the "Commissioner of Patents, Washington, D. C."